United States Patent [19]

Arahara et al.

[11] Patent Number: 5,032,849

[45] Date of Patent: Jul. 16, 1991

[54] METHOD FOR TRANSFERRING A VISCOUS SUBSTANCE WHOSE ADHESIVENESS IS REDUCED WHEN A VOLTAGE IS APPLIED THERETO AND WHICH HAS ADHESIVE CHARACTERISTICS WHEN NO VOLTAGE IS APPLIED THERETO BY DISPERSING THE VISCOUS SUBSTANCE BETWEEN AND APPLING A VOLTAGE TO FIRST AND SECOND ELECTRODES

[75] Inventors: Kohzoh Arahara; Hiroshi Fukumoto, both of Kawasaki, Japan

[73] Assignee: Canon Kabushiki Kaisha, Tokyo, Japan

[21] Appl. No.: 416,488

[22] Filed: Oct. 3, 1989

[30] Foreign Application Priority Data

Oct. 4, 1988 [JP] Japan ................................ 63-251451

[51] Int. Cl.[5] ...................... G01D 15/16; B65G 54/00

[52] U.S. Cl. ................................ 346/1.1; 346/140 R

[58] Field of Search ................. 346/1.1, 76 R, 76 PH, 346/150, 139 R, 140 R, 134, 138, 135.1; 106/20, 22; 355/256, 258, 280; 118/659; 101/450.1, 453, 463.1, 465, 466, 467, 468

[56] References Cited

U.S. PATENT DOCUMENTS

| | | | |
|---|---|---|---|
| 3,946,671 | 3/1976 | Metcalfe et al. | 101/426 |
| 4,080,897 | 3/1978 | Gundlach | 101/467 |
| 4,205,320 | 5/1980 | Fujii | 346/1.1 |
| 4,387,382 | 6/1983 | Kohashi | 346/140 R |
| 4,725,154 | 2/1988 | Babsch | 346/76 PH |
| 4,833,990 | 5/1989 | Hirt et al. | 101/130 |
| 4,838,940 | 6/1989 | Kan | 106/20 |
| 4,855,763 | 8/1989 | Kan . | |
| 4,881,084 | 11/1989 | Kan et al. | 346/140 R |

FOREIGN PATENT DOCUMENTS

| | | |
|---|---|---|
| 0336238 | 10/1989 | European Pat. Off. . |
| 1436661 | 11/1969 | Fed. Rep. of Germany . |
| 2925096 | 1/1980 | Fed. Rep. of Germany . |
| 3535025 | 4/1987 | Fed. Rep. of Germany . |
| 3633758 | 4/1988 | Fed. Rep. of Germany . |
| 2201653 | 4/1974 | France . |
| 2601900 | 1/1988 | France . |
| 63-30279 | 2/1988 | Japan . |

*Primary Examiner*—George H. Miller, Jr.
*Assistant Examiner*—Scott A. Rogers
*Attorney, Agent, or Firm*—Fitzpatrick, Cella, Harper & Scinto

[57] ABSTRACT

A method for transferring a viscous substance includes the steps of providing a viscous substance having an adhesive characteristic which changes in correpondence to the polarity of a voltage applied thereto. The viscous substance had an adhesive characteristic when no voltage is applied thereto and its adhesiveness is reduced when a voltage is applied thereto. The method further includes the steps of disposing the viscous substance between first and second electrodes and applying a voltage between the first and second electrodes to thereby substantially attach the entirety of the viscous substance to one of the first and second electrodes.

10 Claims, 3 Drawing Sheets

METHOD FOR TRANSFERRING A VISCOUS SUBSTANCE WHOSE ADHESIVENESS IS REDUCED WHEN A VOLTAGE IS APPLIED THERETO BY DISPOSING THE VISCOUS SUBSTANCE BETWEEN AND APPLYING A VOLTAGE TO FIRST AND SECOND ELECTRODES

FIELD OF THE INVENTION AND RELATED ART

The present invention relates to a method of transferring a viscous substance and a process for producing the same.

Hitherto, in a case where a viscous substance such as printing ink, adhesive and pudding is transferred or moved in a chemical plant, etc., the viscous substance is transferred by scooping it with a container, by applying a pressure thereto to be moved in a pipe, or by causing it to adhere to the surfaces of plural rotating rollers successively.

However, these conventional methods have various disadvantages; for example the viscous substance to be transferred adheres to the container or roller surface to cause a loss, or it is troublesome to remove the viscous substance attached to the container the roller.

A technique using such a viscous substance may for example include printing. Our research group has proposed a printing process wherein a voltage is applied to an ink so as to change its adhesiveness, whereby a recording is effected (U.S. patent application Ser. No. 301,146). Our research group has also proposed a printing process wherein an ink remaining in the device used therefor is easily removed (U.S. patent application Ser. No. 325,986).

SUMMARY OF THE INVENTION

A principal object of the present invention is, in view of the above-mentioned problems in the prior art, to provide a method of transferring a viscous substance and a process for producing a viscous substance wherein the viscous substance is transferred without a loss thereof and the removal of the viscous substance attached to a member used therefor may be omitted.

According to the present invention, there is provided a method for transferring a viscous substance, comprising the steps of:

(a) providing a viscous substance capable of changing its adhesiveness corresponding to the polarity of a voltage applied thereto;

(b) disposing the viscous substance between a first electrode and a second electrode; and (c) applying a voltage between the first and second electrodes thereby to substantially attach the entirety of the viscous substance to one of the first and second electrodes.

The present invention also provides a method for transferring a viscous substance, comprising the steps of:

(a) providing a first electrode, a second electrode disposed with a predetermined spacing from the first electrode, and a third electrode disposed with a predetermined spacing from the second electrode;

(b) disposing a viscous substance between the first electrode and the second electrode, the viscous substance being capable of changing its adhesiveness corresponding to the polarity of a voltage applied thereto;

(c) applying a voltage between the first and second electrodes to attach the viscous substance to the second electrode;

(d) disposing the viscous substance between the second and third electrodes; and (e) applying a voltage between the second and third electrode to attach the viscous substance to the third electrode.

The present invention further provides a process for producing a viscous substance, comprising the steps of:

(a) disposing a first material for the viscous substance between a first electrode and a second electrode; the first material being capable of changing its adhesiveness corresponding to the polarity of a voltage applied thereto;

(b) applying a voltage between the first and second electrodes to substantially attach the first material to the second electrode;

(c) causing the first material disposed on the second electrode to contact a third electrode; and (d) supplying a second material for the viscous substance to the first material while applying a voltage between the second and third electrode to move the first material toward the third electrode.

These and other objects, features and advantages of the present invention will become more apparent upon a consideration of the following description of the preferred embodiments of the present invention taken in conjunction with the accompanying drawings.

DETAILED DESCRIPTION OF THE INVENTION

The viscous substance-transferring method according to the present invention utilizes a property of a viscous substance such that when a voltage is applied thereto by means of a pair of electrodes, the viscous substance loses its adhesiveness to one of the pair of electrodes.

Hereinbelow, the present invention is specifically described with reference to the accompanying drawings.

Figure 1:
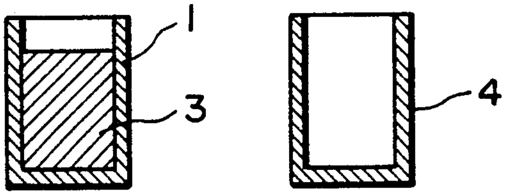
FIGS. 1 to 5 are schematic side sectional views illustrating an embodiment of the viscous substance-transferring method according to the present invention wherein a viscous substance contained in a container is transferred to another container.

Referring to FIG. 1, a viscous substance 3 such as printing ink and adhesive is contained in an electroconductive container 1, as one of the above-mentioned pair of electrode. The container 1 may for example comprise a metal such as stainless steel, copper and aluminum, or a dispersion comprising a resin and metal filler dispersed therein, and may preferably have a hollow cylindrical shape.

Figure 2:
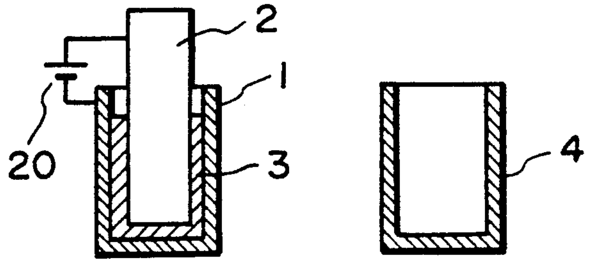

When the viscous substance 3 is transferred from the container 1 to another container 4 constituted in the same manner as in the container 1, an electrode 2 is first inserted into the viscous substance 3, as shown in FIG. 2. The electrode 2 can have any form including bar-like member, plate-like member, etc., but may preferably have such a shape (e.g., a cylindrical shape) that the clearance between it and the container 1 (i.e., the thickness of the viscous substance 3 disposed therebetween) may be substantially uniform in every place. The electrode 2 may preferably be a member of a metal such as copper coated with plating of gold, platinum, etc.

Then, referring to FIG. 2, a DC voltage is applied between the electrode 2 as an anode and the container 1 as a cathode by means of a power supply 20, and the viscous substance 3 loses its adhesiveness on the container 1 side by a mechanism as described hereinafter, whereby the entirety of the viscous substance 3 is substantially attached or held to the electrode 2.

Figure 3:
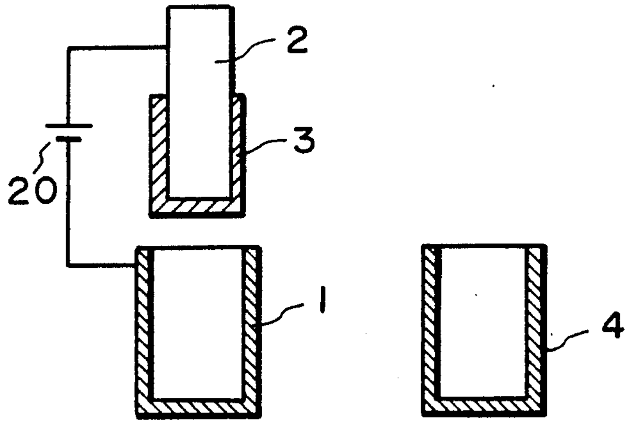

In this state, when the electrode 2 is separated from the container 1, the viscous substance 3 attached to the electrode 2 is carried thereon and is taken out from the container 1, as shown in FIG. 3.

Figure 4:
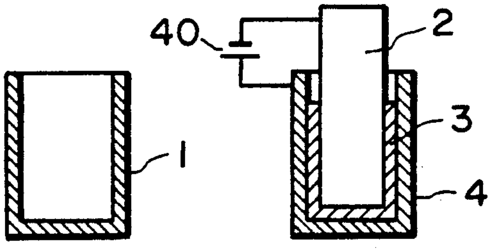
Figure 5:
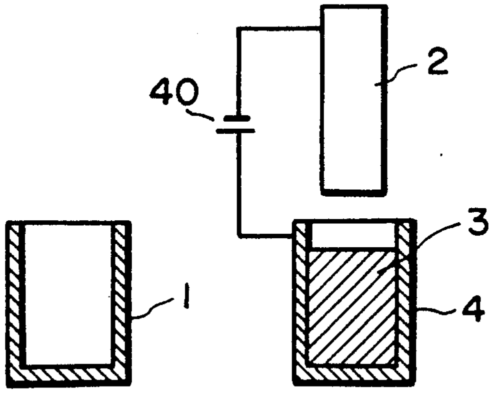

Next, as shown in FIG. 4, the electrode 2 to which the viscous substance 3 is attached is put in a container 4 as another electrode, and a voltage is again applied between the electrode 2 and the container 4 by means of a power supply 40 At this time, the polarity of the voltage used is the reverse to that used in a case where the viscous substance 3 is taken out from the container 1 (i.e., in FIG. 3). More specifically, in the step shown in FIG. 4, the electrode 2 is used as a cathode and the container 4 is used as an anode. When the viscous substance 3 is supplied with a voltage in such a manner, the viscous substance 3 loses its adhesiveness on the electrode 2 side. Accordingly, when the electrode 2 is taken out from the container 4 as shown in FIG. 5, the viscous substance 3 may be caused to remain in the container 4. As a result, the transfer or transport of the viscous substance 3 from the container 1 to the container 4 is completed, and substantially no viscous substance remains in the container 1 or on the electrode 2.

The voltage applied between the above-mentioned electrodes may preferably be a DC voltage of 1-100 V, and more preferably 5-80 V. If the voltage is lower than 1 V, the change from an adhesive state to a non-adhesive state becomes insufficient. If the voltage is higher than 100 V, the power consumption becomes undesirably large.

In the above-mentioned embodiment as shown in FIGS. 1-5, the adhesiveness of a viscous substance disposed on the cathode side is reduced. However, the adhesiveness of a viscous substance disposed on the anode side may also be reduced depending on the kind or composition of the viscous substance.

Figure 6:
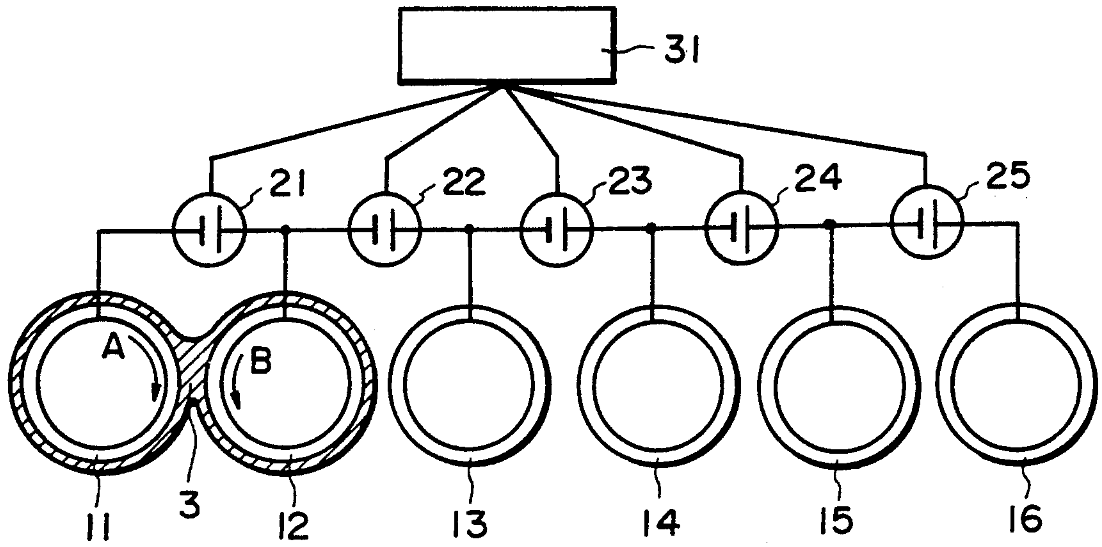
FIGS. 6 to 8 are schematic side sectional views illustrating another embodiment of the viscous substance-transferring method according to the present invention, wherein a viscous substance is transferred by using a plurality of rollers.
Figure 7:
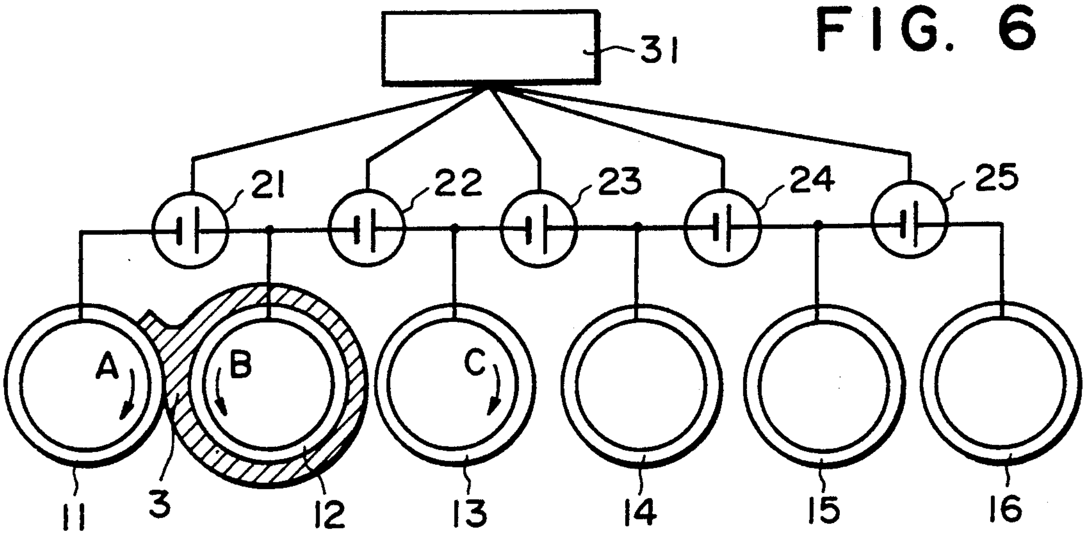
Figure 8:
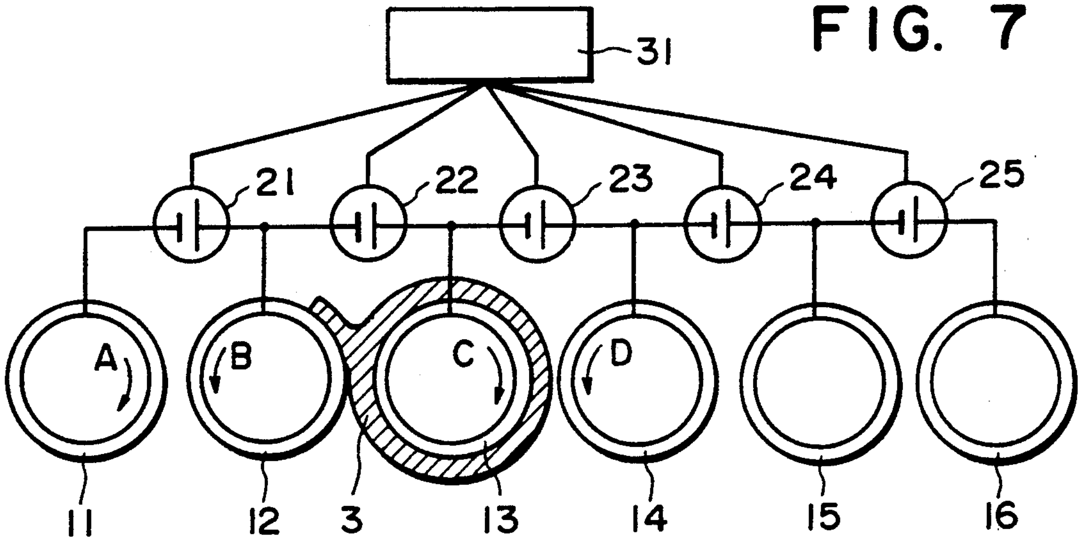

FIGS. 6-8 show another embodiment of the present invention wherein a viscous substance is transferred by using plural rollers.

Referring to FIG. 6, a viscous substance 3 is first supplied between a first roller 11 rotating in the arrow A direction and a second roller 12 rotating in the arrow B direction. Each of the first roller 11 to the sixth roller 16 shown in FIG. 6 functions as an electrode, and power supplies 21-25 are provided so that a voltage is applied to each pair of the adjacent rollers.

Now, when the power supply 21 is turned on by means of a power supply controller 31, the first roller 11 functions as a cathode and the second roller 12 functions as an anode, whereby a viscous substance 3 loses its adhesiveness on the first roller 11 side. Accordingly, the viscous substance 3 is selectively attached to the second roller 12 along with the rotations of the first roller 11 and the second roller 12, as shown in FIG. 7.

Next, the viscous substance 3 disposed on the second roller 12 is separated from the first roller 11 while the application of the voltage due to the power supply 21 is continued, and the viscous substance 3 disposed on the second roller 12 is caused to contact a third roller 13 rotating in the arrow C direction. Further, when a power supply 22 is turned on by means of the power supply controller 31 and a voltage is applied between the second roller as a cathode and the third roller as an anode, the adhesiveness of the viscous substance 3 is reduced on the second roller 12 side as shown in FIG. 8, whereby the viscous substance 3 is transferred onto the third roller 13.

Next, the viscous substance 3 attached to the third roller 13 is separated from the second roller 12, and is caused to contact a fourth roller 14 rotating in the arrow D direction.

Further, when the above-mentioned operations are repeated in a similar manner, the viscous substance 3 is finally transferred to a sixth roller 16.

In a case where a viscous substance is transferred by using plural electrodes (e.g., three electrodes comprising first, second and third rollers), the clearance or gap between each pair of adjacent electrodes may be either constant or variable. For example, in a case where substantially the whole amount of a viscous substance disposed between first and second electrodes is once transferred to the second electrode, and thereafter the viscous substance is transferred to a third electrode disposed adjacent to the second electrode, it is preferred that at least the clearance between the second and third electrodes is variable. More specifically, it is preferred to control the clearance between the second and third electrodes so that substantially the whole amount of the viscous substance is once transferred to the second electrode (at this time, the viscous substance disposed on the second electrode does not contact the third electrode), and then the viscous substance disposed on the second electrode is caused to contact the third electrode.

The above-mentioned viscous substance-transferring method according to the present invention may be applied to the production of a viscous substance.

Figure 9:
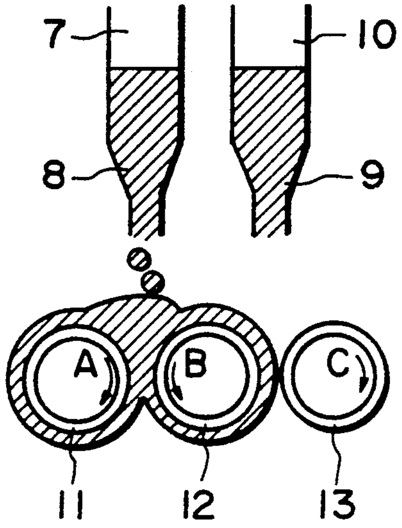
FIGS. 9 to 12 are schematic side sectional views illustrating an embodiment of the process for producing a viscous substance according to the present invention.

FIG. 9 shows an embodiment of such a device for producing a viscous substance. Referring to Figure 9, a first hopper 7 is disposed above the clearance between a first roller 11 and a second roller 12, and a second hopper 10 is disposed above the clearance of the second roller 12 and a third roller 13. For example, the first and second hoppers 7 and 10 respectively contain materials 8 and 9 constituting a viscous substance such as ink and adhesive to be produced.

Figure 10:
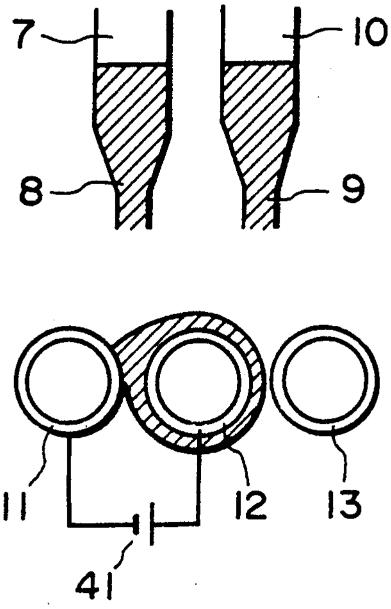

As shown in FIG. 9, a predetermined amount of the material 8 is first supplied between the first roller 11 and the second roller 12 from the hopper 7. After the completion of the supply of the material 8, when a voltage is applied between the first roller 11 as a cathode and the second roller 12 as an anode by means of a power supply 41, the material 8 is transferred or moved to the second roller 12 as shown in FIG. 10. Further, when the material 8 disposed on the second roller 12 is separated from the first roller 11 and is caused to contact the third roller 13, the material 8 is attached to both of the second roller 12 and the third roller 13 because of its adhesiveness.

Figure 11:
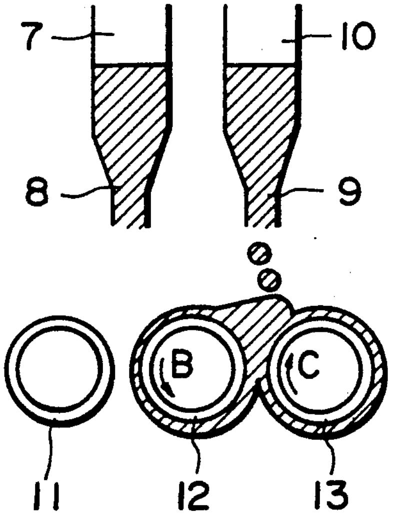
Figure 12:
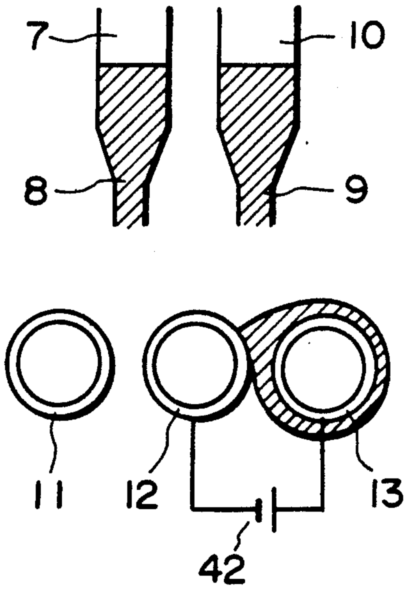

Next, when a predetermined amount of another material 9 is supplied from the hopper 10 to the clearance between the second roller 12 and the third roller 13, as shown in FIG. 11, the material 8 is mixed with the thus supplied material 9 due to the rotation of the second roller 12 and the third roller 13. After the materials 8 and 9 are sufficiently mixed, a voltage is applied between the second roller 12 as a cathode and the third roller 13 as an anode by means of a power supply 42 as shown in FIG. 12, a viscous substance produced from the materials 8 and 9 is obtained on the third roller 13.

In a case where a viscous substance is produced by using the above-mentioned production process, it is necessary that the material to be first supplied to a roller (i.e., the material 8 in the embodiment shown in FIGS. 9–12) per se is a viscous substance having an adhesiveness.

In the present invention, it is also possible to dispose at least one electrode such as the roller shown in FIG. 6 for simply transferring the viscous substance 3, between the first and second rollers 11 and 12, and/or between the second and third rollers 12 and 13, as shown in FIG. 9. Further, it is possible to dispose three or more hoppers or to selectively operate one or more of these hoppers so that a desired combination of two or more materials contained therein may be used for the production of a viscous substance.

In the present invention, there may be utilized some embodiments as follows, with respect to mechanisms wherein a viscous substance is converted from an adhesive state into a non-adhesive state under the application of (1) In one additional a viscous substance is subjected to electrolysis to generate a gas on the basis of electric conduction due to voltage application, whereby the adhesiveness of the viscous substance is changed.

In such an embodiment, the viscous substance is caused to generate a gas in the neighborhood of one electrode under voltage application, whereby the viscous substance becomes non-adhesive to the electrode due to the gas.

When the viscous substance contains a solvent such as water, alcohol and glycol; or a solvent containing an electrolyte such as sodium chloride and potassium chloride dissolved therein, the viscous substance is subjected to electrolysis to generate a gas. The electric resistance of the viscous substance may preferably be as low as possible. More specifically, the volume resistivity of the viscous substance may preferably be $10^9$ ohm.cm or below, more preferably $10^4$ ohm.cm or below, and most preferably $10^2$ ohm.cm or below. If the volume resistivity exceeds $10^9$ ohm.cm, the quantity of electric conduction becomes too small, or a high voltage is required in order to prevent a decrease in the quantity of electric conduction.

For example, the generation of a gas in an hydroxyl group (-OH)-containing solvent based on electrolysis due to electric conduction, or the generation of a gas in water based on electrolysis due to electric conduction may be considered as follows:

On the cathode side:

$$2ROH^+ + 2e^- \rightarrow H_2\uparrow + 2RO^-$$

(One mole of hydrogen gas is generated)

(In the case of water):

$$2H^+ + 2e^- \rightarrow H_2\uparrow$$

(One mole of hydrogen gas is generated)

On the anode side:

$$2ROH \rightarrow 2RCHO + 2H^+ + 2e^-$$

(In the case of water):

$$2OH^- \rightarrow H_2O + \frac{1}{2}O_2 \rightarrow + 2e^-$$

($\frac{1}{2}$ mole of oxygen gas is generated)

As shown in the above formulas, the amount of generated gas is proportional to the amount of electrons (e−), *i.e., the magnitude of an electric current, and the gas is generated only on the cathode side (in the case of the hydroxyl group-containing solvent other than water), or the gas is generated on the cathode side in an amount which is two times that of the gas generated on the anode side. In other words, when the difference in the amount of the generated gas is not smaller than a certain value, the viscous substance becomes non-adhesive to either one electrode (e.g., cathode in the case expressed by the above-m formulas).*

(2) In another embodiment, the adhesiveness of a viscous substance is changed on the basis of a Coulomb force under voltage application.

In such an embodiment, a viscous substance basically comprising inorganic or organic fine particles and a liquid dispersion medium is used, and the viscous substance is converted from an adhesive state to a non-adhesive state by utilizing a difference in chargeability of the fine particles.

More specifically, in a case where the viscous substance contains negatively chargeable fine particles (i.e., those capable of being easily charged negatively), the viscous substance on the cathode side becomes non-adhesive to the cathode when a voltage is applied to the viscous substance. In a case where the viscous substance contains positively chargeable fine particles (i.e., those capable of being easily charged positively), the viscous substance on the anode side becomes non-adhesive to the anode when a voltage is applied- to the viscous substance., (3) In still another embodiment, the surface of a viscous substance contacting an electrode changes its viscosity or cohesion due to electric conduction based on the application of a voltage, whereby the viscous substance reduces its adhesiveness to the electrode.

Examples of such a viscous substance capable of changing its viscosity or cohesion due to a change in pH value, etc. in the vicinity of an electrode due to electric conduction may include one utilizing a change in the crosslinked structure of a gel comprising a polymer, as described in Japanese Laid-Open Patent Application (KOKAI) No. 30279/1988 (corresponding to U.S. patent application Ser. No. 075,045).

However, in such a case, it is difficult to transfer or convey the whole viscous substance when the viscous substance shows such a property that its viscosity is remarkably decreased and its cohesion is extremely decreased in the vicinity of one electrode. Accordingly, such a viscous substance is difficult to be used in the present invention. More specifically, it is preferred that the cohesion of the viscous substance is larger than the adhesiveness thereof on one electrode side to which the viscous substance becomes non-adhesive.

It is considered that the mechanism by which a viscous substance is converted from an adhesive state to a non-adhesive state under voltage application is any one of the above-mentioned three mechanisms (1), (2) and (3). It is possible that the mechanism of such a conversion is a combination of two or more of the above-mentioned three mechanisms.

Incidentally, with respect to a portion of a layer of viscous substance supplied with a voltage, almost the whole viscous substance layer along the thickness direction is transferred to a transfer-receiving member such as roller (hereinafter such a transfer of a viscous substance is referred to as "bulk transfer").

If the viscous substance used in the present invention is a liquid having a low viscosity such as water and alcohol, the cohesive force is weak, whereby it is difficult to obtain a suitable adhesiveness.

More specifically, the viscous substance used in the present invention may preferably satisfy at least one of the following properties.

(1) Adhesiveness

A sample viscous substance is caused to adhere to a stainless steel plate of 1 cm×1 cm in size coated with platinum plating which is vertically disposed, so that a 2 mm-thick ink layer is formed on the stainless steel plate, and is left standing as it is for 5 sec. in an environment of a temperature of 25° C. and a moisture of 60%. Then, the height of the viscous substance is measured. Through the measurement, the viscous substance used in the present invention may preferably be substantially held on the stainless steel plate. More specifically, the above-mentioned height of the viscous substance layer may preferably be 50% or more, and more preferably 80% or more, based on the original height thereof.

(2) Adhesiveness under no voltage application

A 2 mm-thick layer of a sample viscous substance is sandwiched between two stainless steel plates each of 1 cm×1 cm in size coated with platinum plating which are vertically disposed, and the stainless steel plates are separated from each other at a peeling speed of 5 cm/sec under no voltage application. Then, the areas of both plates covered with the viscous substance are respectively measured. Through the measurement, in the viscous substance used in the present invention, the respective plates may preferably show substantially the same adhesion amount of the viscous substance. More specifically, each plate may preferably show an area proportion of 0.7–1.0, in terms of the proportion of the area measured above to the area of the plate which has originally been covered with the above-mentioned 2 mm-thick viscous substance layer.

(3) Adhesiveness under voltage application

A sample viscous substance is applied onto a stainless steel plate of 1 cm×1 cm coated with platinum plating to form an about 2 mm-thick viscous substance layer, and another stainless steel plate coated with platinum plating having the same size as described above is disposed on the viscous substance layer, and these two stainless steel plates are vertically disposed. Then, a voltage of +30 V is applied between the above-mentioned two stainless steel plates sandwiching the 2 mm-thick viscous substance layer, while one of the stainless steel used as a cathode (earth) and the other is used as an anode. The stainless steel plates are separated from each other at a peeling speed of 5 cm/sec in an environment of a temperature of 25° C. and a moisture of 60%, while applying the voltage in the above-mentioned manner, and then the weight of the viscous substance attached to each of the stainless steel plates is measured. Through the measurement, in the viscous substance used in the present invention, it is preferred that the weight of the viscous substance attached to one electrode (to which a larger amount of the viscous substance is attached) is 800 times or more, and more preferably 1000 times or more, that of the viscous substance attached to the other electrode.

As described hereinabove, when a viscous substance contains a solvent capable of being electrolyzed to generate a gas, the change thereof from an adhesive state to a non-adhesive state may occur at an electrode of one side.

In such a case, the solvent may preferably comprise: water, an alcohol such as methanol and ethanol; a solvent having a hydroxyl group such as glycerin, ethylene glycol and propylene glycol; or a solvent wherein an electrolyte such as sodium chloride and potassium chloride is dissolved. The solvent content may preferably be 40–95 wt. parts, and more preferably 60–85 wt. parts, per 100 wt. parts of the viscous substance.

When, water or an aqueous solvent is used as the solvent, hydrogen gas is liable to be generated at the cathode side. When water and another solvent are mixed, the water content may preferably be 1 wt. part or more, more preferably 5–99 wt. parts, per 100 wt. parts of the viscous substance.

When the adhesiveness of the viscous substance is changed due to a Coulomb force, charged or chargeable fine particles may be used as the entirety or a part of the above-mentioned fine particles and are mixed or kneaded in a liquid dispersion medium as described hereinafter, e.g., by means of a homogenizer, a colloid mill or an ultrasonic dispersing means, whereby charged particles are obtained.

The "charged particle" used herein refers to a particle which has a charge prior to the kneading. The "chargeable particle" refers to a particle which can easily be charged by triboelectrification.

Examples of the particles to be supplied with a positive charge may include: particles of a metal such as Au, Ag and Cu; particles of a sulfide such as zinc sulfide ZnS, antimony sulfide $Sb_2S_3$, potassium sulfide $K_2S$, calcium sulfide CaS, germanium sulfide GeS, cobalt sulfide CoS, tin sulfide SnS, iron sulfide FeS, copper sulfide $Cu_2S$, manganese sulfide MnS, and molybdenum sulfide $Mo_2S_3$; particles of a silicic acid or salt thereof such as orthosilicic acid $H_4SiO_4$, metasilicic acid $H_2SiO_3$, mesodisilicic acid $H_2Si_2O_5$, mesotetrasilicic acid $H_6Si_4O_{11}$; polyamide resin particles; polyamide-imide resin particles; etc.

Examples of the particles to be supplied with a negative charge may include: iron hydroxide particles, aluminum hydroxide particles, fluorinated mica particles, polyethylene particles, motmorillonite particles, fluorine-containing resin particles, etc.

Further, polymer particles containing various charge-controlling agents used as electrophotographic toners (positively chargeable or negatively chargeable) may be used for such a purpose.

The above-mentioned fine particles may generally have an average particle size of 100 microns or smaller, preferably 0.1–20 microns, more preferably 0.1–10 microns. The fine particles may generally be contained in the viscous substance in an amount of 1 wt. part or more, preferably 3–90 wt. parts, more preferably 5–60 wt. parts, per 100 wt. parts of the viscous substance.

Examples of the solvent to be contained in viscous substance together with the above-mentioned fine particles may include: ethylene glycol, propylene glycol, diethylene glycol, triethylene glycol, tetraethylene glycol, polyethylene glycol (weight-average molecular weight: about 100–1,000), ethylene glycol monomethyl ether, ethylene glycol monoethyl ether, ethylene glycol monobutyl ether, methyl carbitol, ethyl carbitol, butyl carbitol, ethyl carbitol acetate, diethyl carbitol, triethylene glycol monomethyl ether, triethylene glycol monoethyl ether, propylene glycol monomethyl ether, glycerin, triethanolamine, formamide dimethylformamide, dimethylsulfoxide N-methyl-2-pyrrolidone, 1,3-dimethylimidazolidinone, N-methylacetamide, ethylene carbonate, acetamide, succinonitrile, dimethylsulfoxide, formamide, 2-ethoxyethanol, hexamethylphosphoric amide, 2-nitropropane, nitroethane, $\gamma$-butyrolactone, propylene carbonate 1,2,6-hexanetriol, dipropylene glycol, hexylene glycol, etc. These compounds may be used singly or as a mixture of two or more species as desired. The solvent may preferably be contained in an amount of 40–95 wt. parts, more preferably 60–85 wt. parts, per 100 wt. parts of the viscous substance.

Even in the case of the viscous substance capable of generating a gas due to electrolysis, it can contain fine particles such as silica, carbon fluoride, titanium oxide or carbon black, in addition to those as described hereinabove.

In a preferred embodiment of the viscous substance usable in the present invention, in view of the viscoelastic characteristic of the viscous substance, the entirety or a part of the fine particles comprise swelling particles (i.e., particles capable of being swelled) which are capable of retaining the above-mentioned solvent therein.

The "swelling particles" used herein refer to particles having a property such that when they are mixed with a solvent, they incorporate the solvent in their internal structure (e.g., between crystal layers) to be swelled. On the other hand, ordinary particles other than the swelling particles do not incorporate a solvent in their internal structure or between crystal layers.

More specifically, the swelling particles used in the present invention may preferably show "liquid absorption" as defined below, in the range of 1 ml–1000 ml, more preferably 20 ml–500 ml. The liquid adsorption may be measured in the following manner.

A liquid dispersion medium or solvent such as water used in the viscous substance is gradually added to 1 g of powder of the above-mentioned swelling particles while kneading the resultant mixture. The state of the powder is observed and there is found an amount (or a range of amount) of the liquid dispersion medium in which the powder is converted from a dispersed state into the state of a mass, and the mass substantially retains the liquid dispersion medium. At this time, the amount of the liquid dispersion medium added to the powder is the "liquid absorption".

Examples of such swelling particles may include: fluorinated mica such as Na-montmorillonite, Ca-montmorillonite, 3-octahedral synthetic smectites, Na-hectorite, Li-hectorite, Na-taeniolite, Natetrasilicic mica and Li-taeniolite; synthetic mica, silica, etc.

The above-mentioned fluorinated mica may be represented by the following general formula (1).

$$W_{1-1/3}(X,Y)_{2.5-3}(Z_4O_{10})F_2 \quad (1),$$

wherein W denotes Na or Li; X and Y respectively denote an ion having a coordination number of 6, such as $Mg^{2+}$, $Fe^{2+}$, $Ni^2$, $Mn^{2+}$, $Al^{3+}$, and $Li^+$; Z denotes a positive ion having a coordination number of 4 such as $Al^{3+}$, $Si^{4+}$, $Ge^{4+}$, $Fe^{3+}$, $B^{3+}$ or a combination of these including, e.g., $(Al^{3+}/Si^{4+})$.

The swelling particles, in their dry state, may preferably have an average particle size of 0.1–20 microns, more preferably 0.8–15 microns, and most preferably 0.8–8 microns. The content of the swelling particles can be the same as described above with respect to the fine particles, but may more preferably be 8–60 wt. parts per 100 wt. parts of the viscous substance. It is also preferred to use swelling particles having a charge on their surfaces.

In an embodiment of the present invention, in order to control the viscosity of the viscous substance, a polymer soluble in the above-mentioned solvent may be contained in an amount of 1–90 wt. parts, more preferably 1–50 wt. parts, and most preferably 1–20 wt. parts, per 100 wt. parts of the viscous substance.

Examples of such polymer include: plant polymers, such as guar gum, locust bean gum, gum arabic, tragacanth, carrageenah, pectin, mannan, and starch; microorganism polymers, such as xanthane gum, dextrin, succinoglucan, and curdran; animal polymers, such as gelatin, casein, albumin, and collagen; cellulose polymers such as methyl cellulose, ethyl cellulose, and hydroxyethyl cellulose; starch polymers, such as soluble starch, carboxymethyl starch, and methyl starch; alginic acid polymers, such as propylene glycol alginate, and alginic acid salts; other semisynthetic polymers, such as derivatives of polysaccharides; vinyl polymers, such as polyvinyl alcohol, polyvinylpyrolidone, polyvinyl methyl ether, carboxyvinyl polymer, and sodium polyacrylate; and other synthetic polymers, such as polyethylene glycol, ethylene oxide-propylene oxide block copolymer; alkyd resin, phenolic resin, epoxy resin, aminoalkyd resin, polyester resin, polyurethane resin, acrylic resin, polyamide resin, polyamide-imide resin, polyester-imide resin, and silicone resin; etc. These polymers may be used singly or in mixture of two or more species, as desired. Further, there can also be used grease such as silicone grease, and liquid polymer such as polybutene.

In order to obtain the viscous substance according to the present invention, a solvent and fine particles as mentioned above may for example be mixed in an ordinary manner.

Next, there is described a viscous substance whose adhesiveness is changed by the above-mentioned mechanism (3).

The viscous substance used in such an embodiment may comprise a crosslinked substance (inclusive of polyelectrolyte) impregnated with a liquid dispersion medium.

Herein, the "crosslinked substance" refers to a single substance which per se can assume a crosslinked structure, or a mixture of a substance capable of assuming a crosslinked structure with the aid of an additive such as a crosslinking agent for providing an inorganic ion such as borate ion, and the additive. Further, the term "crosslinked structure" refers to a three-dimensional structure having a crosslinkage or crosslinking bond.

Examples of the crosslinked substance include: plant polymers, such as guar gum, locust bean gum, gum arabic, tragacanth, carrageenah, pectin, mannan, and starch; microorganism polymers, such as xanthane gum, dextrin, succinoglucan, and curdran; animal polymers, such as gelatin, casein, albumin, and collagen; cellulose polymers such as methyl cellulose, ethyl cellulose, and hydroxyethyl cellulose; starch polymers, such as soluble starch, carboxymethyl starch, and methyl starch; alginic acid polymers, such as propylene glycol alginate, and alginic acid salts; other semisynthetic polymers, such as derivatives of polysaccharides; vinyl polymers, such as polyvinyl alcohol, polyvinylpyrolidone, polyvinyl methyl ether, carboxyvinyl polymer, and sodium polyacrylate; and other synthetic polymers, such as polyethylene glycol, ethylene oxide-propylene oxide block copolymer. These polymers may be used singly or in mixture of two or more species, as desired.

In the present invention, there may preferably be used a viscous substance containing the crosslinked substance in a proportion of 0.2–50 wt. parts, and particularly 0.5–30 wt. parts, with respect to 100 wt. parts of the liquid dispersion medium.

When an oil such as mineral oil or an organic solvent such as toluene is used as the liquid dispersion medium, the crosslinked substance may be composed of or from one or a mixture of two or more compounds selected from metallic soaps inclusive or metal stearates, such as aluminum stearate, magnesium stearate, and zinc stearate, and, similar metal salts of other fatty acids, such as palmitic acid, myristic acid, and lauric acid; or organic substances such as hydroxypropyl cellulose derivative, dibenzylidene-Dsorbitol, sucrose fatty acid esters, and dextrin fatty acid esters.

In the embodiment of the present invention described hereinabove, the viscous substance is caused to have a non-adhesiveness to one of a pair of electrodes. However, it is possible to transfer a viscous substance by causing the viscous substance to have a non-adhesiveness to both of a pair of electrodes.

In such an embodiment, for example, a viscous substance may be disposed or sandwiched between a pair of electrodes and conveyed or moved to another place as it is, and then a voltage may be applied between the pair of electrodes to cause the viscous substance to be non-adhesive to both of the pair of electrodes, whereby the viscous substance is separated from the pair of electrodes.

Hereinbelow, the present invention will be explained in more detail with reference to the following Examples.

EXAMPLE 1

A viscous substance comprising the following components was transferred by using a method as shown in FIGS. 1-5.

| | |
|---|---|
| Montmorillonite<br>(trade name: Kunipia F, mfd. by<br>Kunimine Kogyo K.K.; plate-like crystal,<br>average particle size = about 0.2 micron) | 7 g |
| Water | 46 g |

Incidentally, a similar viscous substance comprising the above-mentioned components is widely used as a humectant or thickening agent in, e.g., cosmetics, paint, detergents, medicine, etc.

Referring to FIGS. 1 and 2, each of the containers 1 and 4 used herein was a hollow cylindrical member of stainless steel having an inside diameter of 6 cm and a depth of 12 cm, and the electrode 2 used herein was a cylindrical member of copper coated with platinum plating having an outside diameter of 5 cm and a height of 14 cm.

Referring to FIG. 1, the above-mentioned components were charged in the container 1 and sufficiently mixed therein to prepare a viscous substance 3 having a volume resistivity of 363 ohm.cm. At this time, the electrode 2 was used as a stirring rod.

Next, as shown in FIG. 2, the electrode 2 was statically disposed substantially in the center of the container 1 so that it did not contact the bottom of the container 1, and a DC voltage of 20 V was applied between the electrode 2 as an anode and the container 1 as a cathode. When the electrode 2 was lifted while the voltage was applied thereto in the above-mentioned manner, the viscous substance 3 was attached to the electrode 2 and was taken out from the container 1. At this time, it was found that substantially no viscous substance was attached to the container 1.

Then, the electrode 2 to which the viscous substance 3 was attached was inserted in the container 4, and a DC voltage of 20 V was applied between the electrode 2 as a cathode and the container 4 as an anode. Further, the electrode 2 was lifted while the voltage was applied thereto in the above-mentioned manner. At this time, it was found that substantially no viscous substance was attached to the electrode 2 and the viscous substance 3 was entirely contained in the container 4.

EXAMPLE 2

| | |
|---|---|
| Glycerin | 20 g |
| Lithium taeniolite ($LiMg_2Li(Si_4O_{10})F_2$) | 10 g |
| Water | 20 g |

A viscous substance was prepared in the same manner as in Example 1 except for using the above-mentioned components instead of those used in Example 1.

When the thus prepared viscous substance 3 was subjected to the transfer operation in the same manner as in Example 1, the viscous substance 3 was transferred from the container 1 to the container 4 in the same manner as in Example 1. After the viscous substance 3 was transferred to the container 4, it was found that substantially no viscous substance was attached to the container 1 or the electrode 3.

Incidentally, since the above-mentioned viscous substance 3 had a volume resistivity of 1940 ohm.cm, the voltage supplied from the power supplies 20 and 40 was set to 40 V.

EXAMPLE 3

The viscous substance prepared in Example 2 was transferred by using a method as shown in FIGS. 6-8.

In the apparatus as shown in FIG. 6, each of the first roller 11 to the sixth roller, 16 comprised a stainless steel roller whose peripheral surface was coated with platinum plating, and had a diameter of 34 mm and a width of 8 cm. The minimum clearance between each pair of adjacent rollers was set to about 0.3 mm, and each of the first roller 11 to the sixth roller 16 was rotated at 5 rpm. The above-mentioned clearance of 0.3 mm was maintained to be constant with respect to a pair of rollers for a period of time during which the pair of rollers were actually used for the transfer of the viscous substances.

First, 5 g of the viscous substance 3 was supplied to the clearance between the first roller 11 rotating in the arrow A direction and the second roller 12 rotating in the arrow B direction, whereby the viscous substance 3 was attached to both of the first and second rollers 11 and 12. Then, a power supply 21 was turned on by means of a power supply controller 31 so that a DC voltage of 30 V was applied between the first roller 11 as a cathode and the second roller 12 as an anode. As a result, the entirety of the viscous substance 3 was attached onto the second roller 12.

After the entirety of the viscous substance 3 was transferred to the second roller 12, a power supply 22 was turned on by means of the power supply controller 31 so that a DC voltage of 30 V was applied between the second roller 12 as a cathode and the third roller 13 as an anode. As a result, the entirety of the viscous substance 3 was attached onto the third roller 13.

The above-mentioned procedure was repeated while each of power supplies 23, 24 and 25 was controlled by means of the power supply controller 31 so that the viscous substance 3 was successively transferred from the third roller 13 to the forth roller 14, the fifth roller 15 and the sixth roller 16 in the same manner as described above, whereby the entirety of the viscous substance 3 was finally transferred to the sixth roller 16. After the viscous substance 3 was transferred to the sixth roller 16, it was found that substantially no viscous substance was attached to each of the first roller 11 to the fifth roller 15. The DC voltages applied from the power supplies 21 to 25 were all set to 30 V.

EXAMPLE 4

A black ink was prepared according to a process as described hereinabove with reference to FIGS. 9 to 12.

In the apparatus as shown in FIG. 9, each of the first roller 11 to the third roller 13 comprised a stainless steel roller of which peripheral surface was coated with platinum plating, and had a diameter of 40 mm and a width of 6 cm. The minimum clearance between each pair of adjacent rollers was set to about 0.3 mm.

In this instance, the viscous substance prepared in Example 2, as a material 8 was charged in a first hopper 7 disposed above the clearance between the first and second rollers 11 and 12, and carbon black 9 (trade name, Stering R, mfd. by Cabot Co., U.S.A.) as a material 9 was charged in a second hopper 10 disposed above the clearance between the second and third rollers 12 and 13.

First, 5 g of the viscous substance 8 was supplied from the first hopper 7 to the clearance between the first roller 11 and the second roller 12, and the first roller 11 was rotated at 5 rpm in the arrow A direction and the second roller 12 was rotated at 5 rpm in the arrow B direction, whereby the viscous substance 8 was attached to both of the first and second rollers 11 and 12.

Then, as show in FIG. 10, a power supply 41 was connected to the first and second rollers 11 and 12 so that a DC voltage of 30 V was applied between the first roller 11 as a cathode and the second roller 12 as an anode. As a result, along with the rotation of the first and second rollers 11 and 12, the entirety of the viscous substance 8 was transferred to the second roller 12.

After the entirety of the viscous substance 8 was transferred to the second roller 12, the viscous substance 8 disposed on the second roller 12 was separated from the first roller 11 and was caused to contact the third roller 13 rotating at 5 rpm in the arrow C direction, and 0.3 g of the carbon black 9 was supplied from the second hopper 10 to the viscous substance 8 disposed on the second roller 12 as shown in FIG. 11. The viscous substance 8 and the carbon black 9 added thereto were mixed sufficiently on the basis of the rotation of the second and third rollers 12 and 13, while the mixture was attached to both of the rollers 12 and 13.

Then, a power supply 42 was connected to the second roller 12 and the third roller 13 so that a DC voltage of 30 V was applied between the second roller 12 as a cathode and the third roller 13 as an anode. As a result, the viscous substance 8 containing the carbon black 9 mixed therein was entirely transferred to the third roller 13, whereby a black ink was obtained on the third roller 13.

As described hereinabove, according to the present invention, a viscous substance may be transferred to a predetermined object by using at least one intermediate member such as container and roller without a loss thereof. Further, after the viscous substance is transferred to the object, the viscous substance is not substantially attached to the intermediate member, whereby the removal of the remaining viscous substance on the intermediate member may be omitted.

What is claimed is:

1. A method for transferring a viscous substance, comprising the steps of:

(a) providing a viscous substance having an adhesive characteristic which changes in correspondence to a polarity of a voltage applied thereto, wherein the viscous substance has an adhesive characteristic when no voltage is applied thereto and wherein the adhesiveness of the viscous substance is reduced when a voltage is applied thereto;

(b) disposing the viscous substance between a first electrode and a second electrode; and (c) applying a voltage between the first and second electrodes to thereby substantially attach the entirety of the viscous substance to one of the first and second electrodes.

2. A method according to claim 1, wherein the first electrode comprises a container, and the second electrode is disposed in the container so that said disposing step comprises the step of disposing the viscous substance between the container and the second electrode.

3. A method according to claim 1, further comprising the steps of:

applying a voltage between the first and second electrodes to substantially attach the entirety of the viscous substance to the second electrode;

causing the viscous substance disposed on the second electrode to contact a third electrode; and applying a voltage between the second and third electrodes to substantially attach the entirety of the viscous substance to the third electrode.

4. A method according to claim 3, wherein said causing step and said step of applying a voltage between the second and third electrodes are repeated so that the entirety of the viscous substance is substantially transferred to a predetermined electrode.

5. A method according to claim 3, wherein the first and third electrodes comprise first and second containers, respectively; and further comprising the step of disposing the second electrode in the first container so that said disposing step comprises of the step of disposing the viscous substance between the first container and the second electrode and so that said step of applying a voltage between the first and second electrodes to substantially attach the entirety of the viscous substance to the second electrode comprises the step of applying a voltage to the first container and the second electrode to substantially attach the entirety of the viscous substance to the second electrode, and further comprising the step of disposing the second electrode in the second container, and wherein step of applying a voltage between the second and third electrodes comprises the step of applying a voltage to the second electrode and the second container to substantially attach the entirety of the viscous substance to the second container.

6. A method for transferring a viscous substance, comprising the steps of:

(a) providing a first electrode, a second electrode disposed with a predetermined spacing from the first electrode, and a third electrode disposed with a predetermined spacing from the second electrode;

(b) disposing a viscous substance between the first electrode and the second electrode; said viscous substance having an adhesive characteristic which changes in correspondence to a polarity of a voltage applied thereto, wherein the viscous has an adhesive characteristic when no voltage is applied thereto and wherein the adhesiveness of the viscous substance is reduced when a voltage is applied thereto;

(c) applying a voltage between the first and second electrodes to attach the viscous substance to the second electrode;

(d) disposing the viscous substance between the second and third electrode; and (e) applying a voltage between the second and third electrodes to attach the entirety of the viscous substance to the third electrode.

7. A method according to claim 6, wherein said first, second and third electrodes comprise rollers.

8. A method according to claim 6, wherein steps (d) and (e) are repeated so that the entirety too a predetermined electrode.

9. A process for producing a viscous substance comprising a plurality of materials, comprising the steps of:

(a) disposing a first material for the viscous substance between a first electrode and a second electrode; the first material having an adhesive characteristic which changes in correspondence to a polarity of a voltage applied thereto, wherein the viscous substance has an adhesive characteristic when no voltage is applied thereto and wherein the adhesiveness of the viscous substance is reduced when a voltage is applied thereto;

(b) applying a voltage between the first and second electrodes to substantially attach the entirety of the first material to the second electrode;

(c) causing the first material disposed on the second electrode to contact a third electrode; and (d) supplying a second material for the viscous substance to the first material while applying a voltage between the second and third electrodes to move the first material toward the third electrode.

10. A process according to claim 9, wherein the steps (c) and (d) are repeated so as to provide a viscous substance comprising three or more materials.

* * * * *

UNITED STATES PATENT AND TRADEMARK OFFICE

CERTIFICATE OF CORRECTION

PATENT NO. : 5,032,849 Page 1 of 5

DATED : July 16, 1991

INVENTOR(S) : Kohzoh Arahara, et al.

It is certified that error appears in the above-identified patent and that said Letters Patent is hereby corrected as shown below:

TITLE PAGE:

[54] TITLE:

Lines 1-9, the title should read as follows:

--METHOD FOR TRANSFERRING A VISCOUS SUBSTANCE HAVING ADHESIVE CHARACTERISTICS WHICH ARE REDUCED WHEN A VOLTAGE IS APPLIED--.

[57] ABSTRACT:

Line 5, change "had" to --has--.

COLUMN 1

Lines 2-7, the title should read as follows:

--METHOD FOR TRANSFERRING A VISCOUS SUBSTANCE HAVING ADHESIVE CHARACTERISTICS WHICH ARE REDUCED WHEN A VOLTAGE IS APPLIED--.

Line 23, change "example" to --example,--.

UNITED STATES PATENT AND TRADEMARK OFFICE
CERTIFICATE OF CORRECTION

PATENT NO. : 5,032,849 Page 2 of 5

DATED : July 16, 1991

INVENTOR(S) : Kohzoh Arahara, et al.

It is certified that error appears in the above-identified patent and that said Letters Patent is hereby corrected as shown below:

COLUMN 2

Line 59, change "electrode." to --electrodes.--.

COLUMN 3

Line 23, change "supply 40" to --supply 40.--.
Line 24, change "to" to --of--.

COLUMN 5

Line 29, after "of" add --a voltage--.
Line 30, change "additional" to --embodiment--.
Line 40, change "glycol;" to --glycol,--.
Line 53, change "an" to --a--.

UNITED STATES PATENT AND TRADEMARK OFFICE
CERTIFICATE OF CORRECTION

PATENT NO. : 5,032,849

DATED : July 16, 1991

INVENTOR(S) : Kohzoh Arahara, et al.

It is certified that error appears in the above-identified patent and that said Letters Patent is hereby corrected as shown below:

COLUMN 6

Line 6, change "$2OH^- \rightarrow H_2O + \frac{1}{2}O_2 \rightarrow + 2e^-$" to --$2OH^- \rightarrow H_2O + \frac{1}{2}O_2 \uparrow + 2e^-$--.

Lines 11-18, delete italics.

Line 17, change "above-m" to --above-mentioned--.

Line 37, change "applied-" to --applied--.

Line 38, change "substance.," to --substance.--.

COLUMN 7

Line 27, change "thereof. (2)" to --thereof.--.

Line 28, before "Adhesiveness" insert --(2)--.

Line 56, change "steel used" to --steel plates is used--.

UNITED STATES PATENT AND TRADEMARK OFFICE

CERTIFICATE OF CORRECTION

PATENT NO. : 5,032,849

DATED : July 16, 1991

INVENTOR(S) : Kohzoh Arahara, et al.

It is certified that error appears in the above-identified patent and that said Letters Patent is hereby corrected as shown below:

COLUMN 8

Line 1, change "that" to --than that--.

Line 43, change "$H_2Si_2O_5$," to --$H_2Si_2O_5$, mesotrisilicic acid $H_4Si_3O_8$,--.

COLUMN 9

Line 8, change "dimethylsulfoxide," to --dimethylsulfoxide, sulfolane, furfuryl alcohol, N,N-dimethyl- --.

COLUMN 10

Line 15, change "carrageenah," to --carrageenan,--.

Line 59, change "carrageenah" to --carrageenan--.

UNITED STATES PATENT AND TRADEMARK OFFICE
CERTIFICATE OF CORRECTION

PATENT NO. : 5,032,849 Page 5 of 5

DATED : July 16, 1991

INVENTOR(S) : Kohzoh Arahara, et al.

It is certified that error appears in the above-identified patent and that said Letters Patent is hereby corrected as shown below:

COLUMN 11

Line 16, change "or" to --of--.

Line 21, change "dibenzylidene-Dsorbitol" to --dibenzylidene-D-sorbitol--.

COLUMN 12

Line 49, change "roller," to --roller--.

COLUMN 13

Line 48, change "show" to --shown--.

COLUMN 16

Line 4, change "entirety too" to --entirety of the viscous substance is substantially transferred to--.

Signed and Sealed this

Thirteenth Day of April, 1993

*Attest:*

STEPHEN G. KUNIN

*Attesting Officer* *Acting Commissioner of Patents and Trademarks*